United States Patent [19]
Davenport

[11] Patent Number: 5,904,187
[45] Date of Patent: May 18, 1999

[54] SEAM INTEGRITY IN MULTIPLE LAYER/ MULTIPLE SEAM PRESS FABRICS

[75] Inventor: Francis L. Davenport, Ballston Lake, N.Y.

[73] Assignee: Albany International Corp., Albany, N.Y.

[21] Appl. No.: 08/955,783

[22] Filed: Oct. 22, 1997

[51] Int. Cl.$^6$ .................................................. D03D 13/00
[52] U.S. Cl. ................................. 139/383 AA; 428/193; 442/225; 442/270; 162/904
[58] Field of Search ........................ 139/383 AA; 428/58, 428/193; 442/247, 205, 225, 270; 162/904

[56] References Cited

U.S. PATENT DOCUMENTS

| | | | |
|---|---|---|---|
| 4,206,787 | 6/1980 | Srandly | 139/383 AA |
| 4,418,726 | 12/1983 | Josef et al. | 139/383 AA |
| 4,902,383 | 2/1990 | Penven | 139/383 AA |
| 4,939,025 | 7/1990 | Nicholas et al. | 139/383 AA |
| 4,979,543 | 12/1990 | Moriarty et al. | 139/383 AA |
| 5,082,532 | 1/1992 | Dufour | 139/383 AA |
| 5,476,123 | 12/1995 | Rydin . | |
| 5,531,251 | 7/1996 | Rydin . | |

*Primary Examiner*—Andy Falik
*Attorney, Agent, or Firm*—Kane, Dalsimer, Sullivan, Kurucz, Levy, Eisele and Richard, LLP

[57] ABSTRACT

An on-machine-seamable papermaker's fabric includes a first and a second base fabric, each of which is joinable into endless form with a seam. The first and second base fabrics are attached to one another by at least one layer of staple fiber batt entangled therethrough such that they are offset with respect to one another in a lengthwise direction when joined. As a consequence, seaming loops at one widthwise edge of the first base fabric coincide with a non-seam region of the second base fabric, and seaming loops at one widthwise edge of the second base fabric coincide with a non-seam region of the first base fabric. When joined into endless form, the first base fabric is an outer base fabric, and the second base fabric is an inner base fabric. At least one extra cross-machine-direction (CD) yarn is woven with at least two of the following: (a) the outer side of the seaming loops of at least one widthwise edge of the outer base fabric; (b) the inner side of the seaming loops of at least one widthwise edge of the outer base fabric; (c) the outer side of the seaming loops of at least one widthwise edge of the inner base fabric; and (d) the inner side of the seaming loops of at least one widthwise edge of the inner base fabric.

18 Claims, 8 Drawing Sheets

SEAM INTEGRITY IN MULTIPLE LAYER/ MULTIPLE SEAM PRESS FABRICS

BACKGROUND OF THE INVENTION

1. Field of the Invention

The present invention relates to the papermaking arts. More specifically, the present invention is a papermaker's fabric of the on-machine-seamable (OMS®) variety, such as an OMS® press fabric for the press section of a paper machine.

2. Description of the Prior Art

During the papermaking process, a fibrous cellulosic web is formed by depositing a fibrous slurry, that is, an aqueous dispersion of cellulose fibers, on a moving forming fabric in the forming section of a paper machine. A large amount of water is drained from the slurry through the forming fabric during this process, leaving the fibrous cellulosic web on the surface of the forming fabric.

The newly formed cellulosic web proceeds from the forming section to a press section, which includes a series of press nips. The fibrous cellulosic web passes through the press nips supported by a press fabric, or, as is often the case, between two press fabrics. In the press nips, the fibrous cellulosic web is subjected to compressive forces which squeeze water therefrom, and which adhere the cellulose fibers in the web to one another to turn the fibrous cellulosic web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a sinuous path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speed. That is to say, the fibrous slurry is continuously deposited onto the forming fabric in the forming section, while a newly manufactured paper sheet is continuously wound onto rolls after it exits from the dryer section.

Referring, for the moment, specifically to press fabrics, it should be recalled that, at one time, press fabrics were supplied only in endless form. This is because a newly formed paper sheet is extremely susceptible to marking in the press nip by any nonuniformity in the press fabric or fabrics. An endless, seamless fabric, such as one produced by the process known as endless weaving, has a uniform structure in both its longitudinal (machine) and transverse (cross-machine) directions. A seam, such as a seam which may be used to close the press fabric into endless form during installation on a paper machine, represents a discontinuity in the uniform structure of the press fabric. The use of a seam, then, greatly increases the likelihood that the paper sheet will be marked in the press nip.

It follows, then, that the seam region of any workable on-machine-seamable (OMS®) press fabric must behave under load, that is, under compression in a press nip, like the rest of the press fabric, and must have the same permeability to water and to air as the rest of the press fabric, in order to prevent the periodic marking of the paper product being manufactured by the seam region. OMS® is a registered trademark of Albany International Corp.

Despite the considerable technical obstacles presented by these requirements, it remained highly desirable to develop an on-machine-seamable (OMS®) press fabric, because of the comparative ease and safety with which it could be installed on the press section. Ultimately, these obstacles were overcome with the development of press fabrics having seams formed by providing seaming loops on the crosswise edges of the two ends of the fabric. The seaming loops themselves are formed by the machine-direction (MD) yarns of the fabric. A seam is formed by bringing the two ends of the press fabric together, by interdigitating the seaming loops at the two ends of the fabric, and by directing a so-called pin, or pintle, through the passage defined by the interdigitated seaming loops to lock the two ends of the fabric together. Needless to say, it is much easier and far less time-consuming to install an OMS® press fabric, than it is to install an endless press fabric, on a paper machine.

There are several methods for producing a press fabric that can be joined on the paper machine with such a seam. One method is to flat-weave the fabric, in which case the warp yarns are the machine-direction (MD) yarns of the press fabric. To form the seaming loops, the warp ends are woven some distance back into the fabric body in a direction parallel to the warp yarns. Another technique, far more preferable, is a modified form of endless weaving, which normally is used to produce an endless loop of fabric. In modified endless weaving, the weft, or filling, yarns are continuously woven back and forth across the loom, in each passage forming a loop on one of the edges of the fabric being woven by passing around a loop-forming pin. As the weft yarn, or filling yarn, which ultimately becomes the MD yarn in the press fabric, is continuous, the seaming loops obtained in this manner are stronger than any that can be produced by weaving the warp ends back into the ends of a flat-woven fabric. In still another method, a fabric is woven endless, and the endless loop of fabric thereby obtained is flattened and given the form of two fabric layers joined to one another at two widthwise ends of the flattened loop. One or more widthwise yarns are then removed from each of the two widthwise ends to produce a short gap defined by the freed, that is, the newly unwoven portions of, lengthwise yarns at each end. These unwoven portions of the lengthwise yarns are then used as seaming loops when the two widthwise ends are brought together as described above.

Generally, the manufacture of an on-machine-seamable (OMS®) press fabric includes the attachment of a staple fiber batt to one or both sides thereof. The attachment may be effected by a process called needling (fiber locking) or by hydroentangling, while the OMS® fabric is joined in endless form. Once the desired amount of staple fiber batt has been attached, the loop-forming pin or pintle is removed to place the OMS® press fabric into flat form for shipment and eventual installation on a paper machine. At this time, the staple fiber batt must be cut in the vicinity of the seam to completely separate the two ends of the OMS® press fabric from one another. Often, the staple fiber batt is cut in a manner that enables it to form a flap over the seaming loops when the OMS® press fabric is rejoined into endless form. In this way, the seam region is practically indistinguishable from the rest of the paper-supporting side of the press fabric.

On the other side, the "roll" side, of the press fabric, however, some staple fiber batt must be removed from the seaming loops to facilitate the later passage of a pintle therethrough. The removal of this generally small amount of staple fiber batt, nevertheless, makes the seam region slightly more permeable to air and water than the rest of the press fabric. This difference in water permeability, or flow resistance, perhaps ever so slight, is enough to cause sheet marking in some situations.

Several approaches to solve this problem have been taken. One approach involves the use of stuffer yarns with the pintle when the OMS® press fabric is being joined into endless form on the paper machine. In another approach, an OMS® press fabric comprises two on-machine-seamable base fabrics, one fitting inside the loop of the other, the two base fabrics being laminated to one another during the needling process. The seam regions of the inner and outer base fabrics are offset slightly with respect to one another, so that the seam region of each will coincide with a non-seam region of the other. Once the desired amount of staple fiber batt has been attached to the inner and/or outer surfaces of the laminated base fabrics, the loop-forming pin or pintle of each on-machine-seamable base fabric is removed to place the OMS® press fabric into flat form for shipment and eventual installation on a papermachine. At this time, the staple fiber batt must be cut in the vicinity of the seam in the outer of the two on-machine-seamable base fabrics to completely separate the two ends of the OMS® press fabric from one another. As above, the staple fiber batt may be cut in a manner that enables it to form a flap over the seaming loops when the OMS® press fabric is rejoined into endless form. Some of the staple fiber batt must also be removed from the seaming loops of both the inner and outer on-machine-seamable base fabrics to facilitate the later passage of pintles therethrough.

In yet another approach, disclosed in U.S. Pat. Nos. 5,476,123 and 5,531,251 to Rydin, one or more extra CD yarns are woven with the seaming loops of at least one end of a base fabric of an on-machine-seamable press fabric. The extra yarn or yarns are woven only with those portions of the seaming loops that are on one side of the fabric, that side preferably being the paper-supporting side. The extra CD yarn or yarns form an extension of the CD yarn system of the base fabric at the seaming loop or loops, conforming the seam region more closely to the rest of the base fabric, so that staple fiber batt will be better anchored to the seam region and so that the possibility of sheet marking by the seam region will be reduced.

The last approach has also been combined with that set forth immediately above in OMS® press fabrics having two on-machine-seamable base fabrics laminated to one another during the needling process, one base fabric again fitting inside the loop of the other. In this hybrid approach, the outer base fabric incorporates the invention disclosed in U.S. Pat. Nos. 5,476,123 and 5,531,251, the teachings of both of which are incorporated herein by reference.

All of these approaches are designed to compensate for the differences between the water permeability or flow resistance of the seam region of an OMS® press fabric and the rest or body of the press fabric. However, none of these approaches has yielded completely satisfactory results for all press types and positions and for all paper grades.

The present invention represents an alternative approach toward solving this problem.

SUMMARY OF THE INVENTION

Accordingly, the present invention is an on-machine-seamable papermaker's fabric which comprises a first base fabric and a second base fabric.

The first base fabric has a system of first machine-direction (MD) yarns and a system of first cross-machine-direction (CD) yarns, the first MD yarns being bound to the first CD yarns. The first base fabric has a rectangular shape with a length, a width, two lengthwise edges, two widthwise edges, a first side and a second side. The first MD yarns form first seaming loops along each of the two widthwise edges of the first base fabric.

The second base fabric, similarly, has a system of second MD yarns and a system of second CD yarns, the second MD yarns being bound to the second CD yarns. The second base fabric likewise has a rectangular shape with a length, a width, two lengthwise edges, two widthwise edges, a first side and a second side. The second MD yarns form second seaming loops along each of the two widthwise edges of the second base fabric.

The first and second base fabrics have substantially equivalent lengths and widths, and are joined to one another by at least one layer of staple fiber batt entangled therethrough. When so joined, the second side of the first base fabric adjoins the first side of the second base fabric. The first and second base fabrics are also offset with respect to one another in a lengthwise direction. As a consequence, the first seaming loops at one widthwise edge of the first base fabric coincide with a non-seam region of the second base fabric, and the second seaming loops at one widthwise edge of the second base fabric coincide with a non-seam region of the first base fabric.

In accordance with the present invention, at least one extra CD yarn is woven with at least two of the following:
  a) the first side of the first seaming loops of at least one widthwise edge of the first base fabric;
  b) the second side of the first seaming loops of at least one widthwise edge of the first base fabric;
  c) the first side of the second seaming loops of at least one widthwise edge of the second base fabric; and
  d) the second side of the second seaming loops of at least one widthwise edge of the second base fabric.

The first base fabric may be the outer base fabric, and the second base fabric the inner base fabric, when the present papermaker's fabric is joined into the form of an endless loop. In such a situation, the first sides of the first and second base fabrics and their respective first and second seaming loops face outward with respect to the endless loop. It follows that the second sides of the first and second base fabrics and their respective first and second seaming loops face inward with respect to the endless loop.

The on-machine-seamable papermaker's fabric is joined into endless form by interdigitating the first seaming loops at the two widthwise edges of the first base fabric and by direction a first pintle through the passage defined by the interdigitated first seaming loops to form a first seam, and by interdigitating the second seaming loops at the two widthwise edges of the second base fabric and by directing a second pintle through the passage defined by the interdigitated second seaming loops to form a second seam. The extra CD yarns woven with the seaming loops as set forth above improve the integrity of the seams, especially by providing improved staple fiber batt retention in the vicinities of the seams, and reduce the marking of fibrous webs by the seams.

The present invention will now be described in more complete detail, with frequent reference being made to the drawing figures identified as follows.

DETAILED DESCRIPTION OF THE PREFERRED EMBODIMENT

Figure 1:
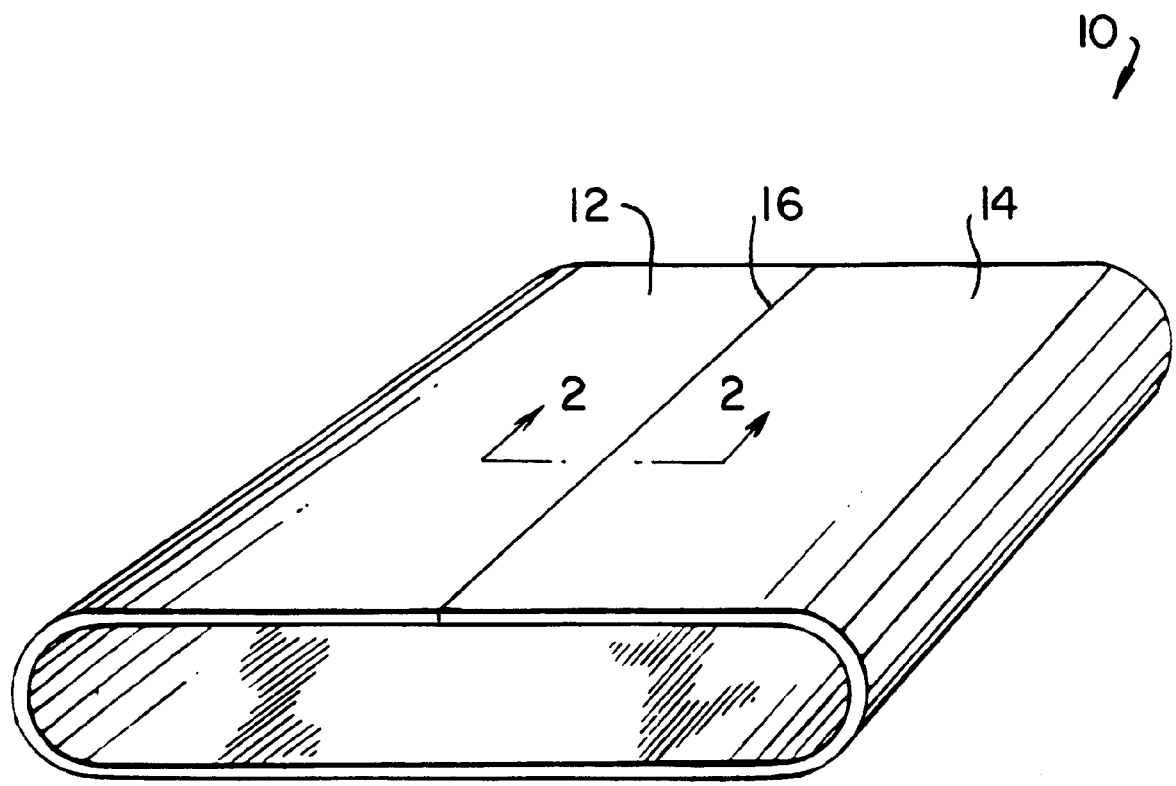
FIG. 1 is a schematic perspective view of an on-machine-seamable press fabric.

Turning now specifically to the figures, FIG. 1 is a schematic perspective view of an on-machine-seamable papermaker's fabric 10. The fabric takes the form of an endless loop once its two ends 12,14 have been joined to one another at seam 16.

Figure 2:
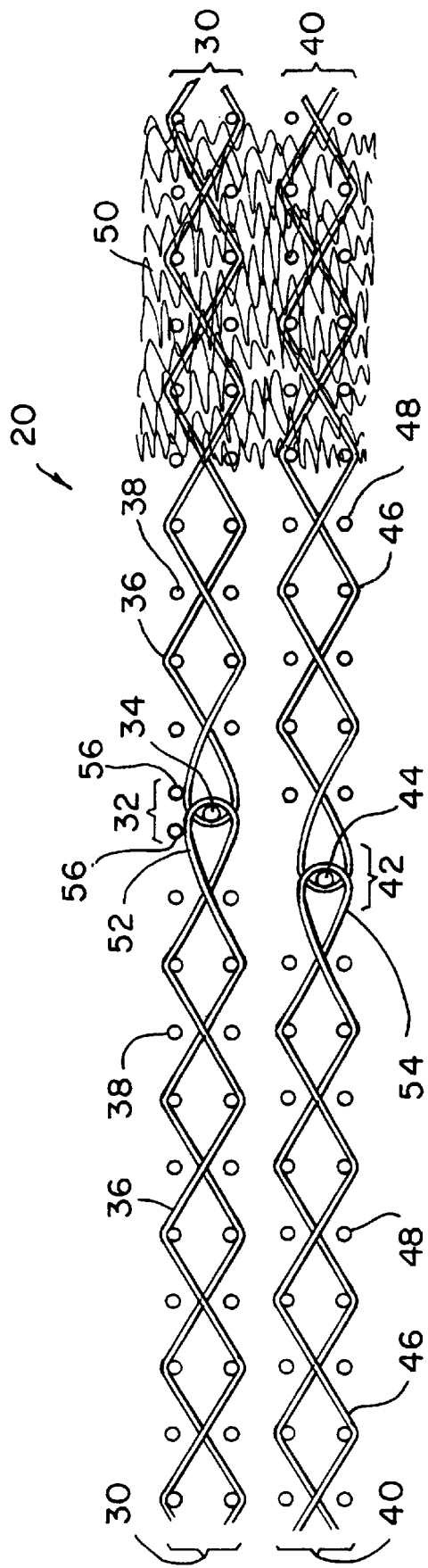
FIG. 2 is a cross-sectional view, taken as indicated by line 2—2 in FIG. 1, of an on-machine-seamable press fabric of the prior art.

FIG. 2 is a cross-sectional view, taken as indicated by line 2—2 in FIG. 1, of an on-machine-seamable papermaker's fabric 20 of the prior art. Papermakers' fabric 20 is of the variety having two on-machine-seamable base fabrics 30, 40. Outer base fabric 30 surrounds inner base fabric 40, the latter being joined into endless form within the endless-loop form of the former. Inner base fabric 40 is of substantially the same length as outer base fabric 30, so that seam 42 is closed by directing pintle 44 therethrough at the same time as, or immediately before or after, seam 32 is closed by directing pintle 34 therethrough. Inner base fabric 40 and outer base fabric 30 are joined to one another by needling one or more layers of staple fiber batt 50 into at least one of the base fabrics 30, 40 to join the two base fabrics 30, 40 to one another. For the sake of clarity, staple fiber batt 50 is shown in only a portion of FIG. 2, but it should be understood that it joins the inner and outer base fabrics 40, 30 to one another at all points except the immediate region of the seams 32, 42, from which batt 50 is removed during processing to facilitate the meshing of the seaming loops 52, 54. Staple fiber batt 50 may comprise staple fibers of any polymeric resin used in the production of papermachine clothing, but are preferably of a polyamide resin.

Outer base fabric 30 is woven from longitudinal, or machine-direction (MD), yarns 36 and transverse, or cross-machine direction (CD), yarns 38. MD yarns 36 form seaming loops 5i which are interdigitated and joined to one another by directing pintle 34 through the passage defined by the interdigitated seaming loops 52 to form seam 32.

In like manner, inner base fabric 40 is woven from longitudinal, or machine-direction (MD), yarns 46 and transverse, or cross-machine-direction (CD), yarns 48. MD yarns 46 form seaming loops 54 which are interdigitated and joined to one another by directing pintle 44 through the passage defined by the interdigitated seaming loops 54 to form seam 42.

It will be recognized in FIG. 2 that both the inner and outer base fabrics 40, 30 are flat-woven, wherein seaming loops 52, 54 are formed by turning back ends of warp yarns at the widthwise edges of the inner and outer base fabrics 40, 30 and by weaving the ends back into the respective fabrics. As depicted in FIG. 2, MD yarns 36, 46 are the warp yarns of the outer and inner base fabrics 30, 40, respectively. It should be understood, however, that either one or both of the inner and outer base fabrics 40, 30 may be woven by a modified endless weaving technique, wherein weft yarns weave continuously back and forth across the loom, form seaming loops by weaving around a loop-forming pin, and ultimately become the MD yarns of the fabric.

MD yarns 36, CD yarns 38, MD yarns 46 and CD yarns 48 may each be of any of the yarn types used to weave papermachine clothing. That is to say, monofilament yarns, which are monofilament strands used singly, or plied/twisted yarns, in the form of plied monofilament or plied multifilament yarns may be used as any of these yarns. Further, MD yarns 36, CD yarns 38, MD yarns 46 and CD yarns 48 may each be the coated yarns shown in commonly assigned U.S. Pat. Nos. 5,204,150 and 5,391,419, the teachings of both of which are incorporated herein by reference.

Further, the filaments comprising MD yarns 36, CD yarns 38, MD yarns 46 and CD yarns 48 are extruded from synthetic polymeric resin materials, such as polyamide, polyester, polyetherketone, polypropylene, polyaramid, polyolefin and polyethylene terephthalate (PET) resins, and incorporated into yarns according to techniques well-known in the textile industry and particularly in the papermachine clothing industry.

Pintles 34, 44 may be single strands of monofilament; multiple strands of monofilament; multiple strands of monofilament untwisted about one another, or plied, twisted, braided or knitted together; or of any of the other pintle types used to join pin seams in papermachine clothing. The pintles 34, 44 may be extruded from synthetic polymeric resin materials, such as those listed in the preceding paragraph.

It will be observed in FIG. 2 that seam 32 in outer base fabric 30 is offset longitudinally from seam 42 in inner base fabric 40. As a consequence, the region of seam 32 in outer base fabric 30 coincides with a non-seam region of the inner base fabric 40. In like manner, the region of seam 42 in inner base fabric 40 coincides with a non-seam region of the outer base fabric 30. This longitudinal offsetting is done to minimize sheet marking and to facilitate seaming on the papermachine.

Figure 6:
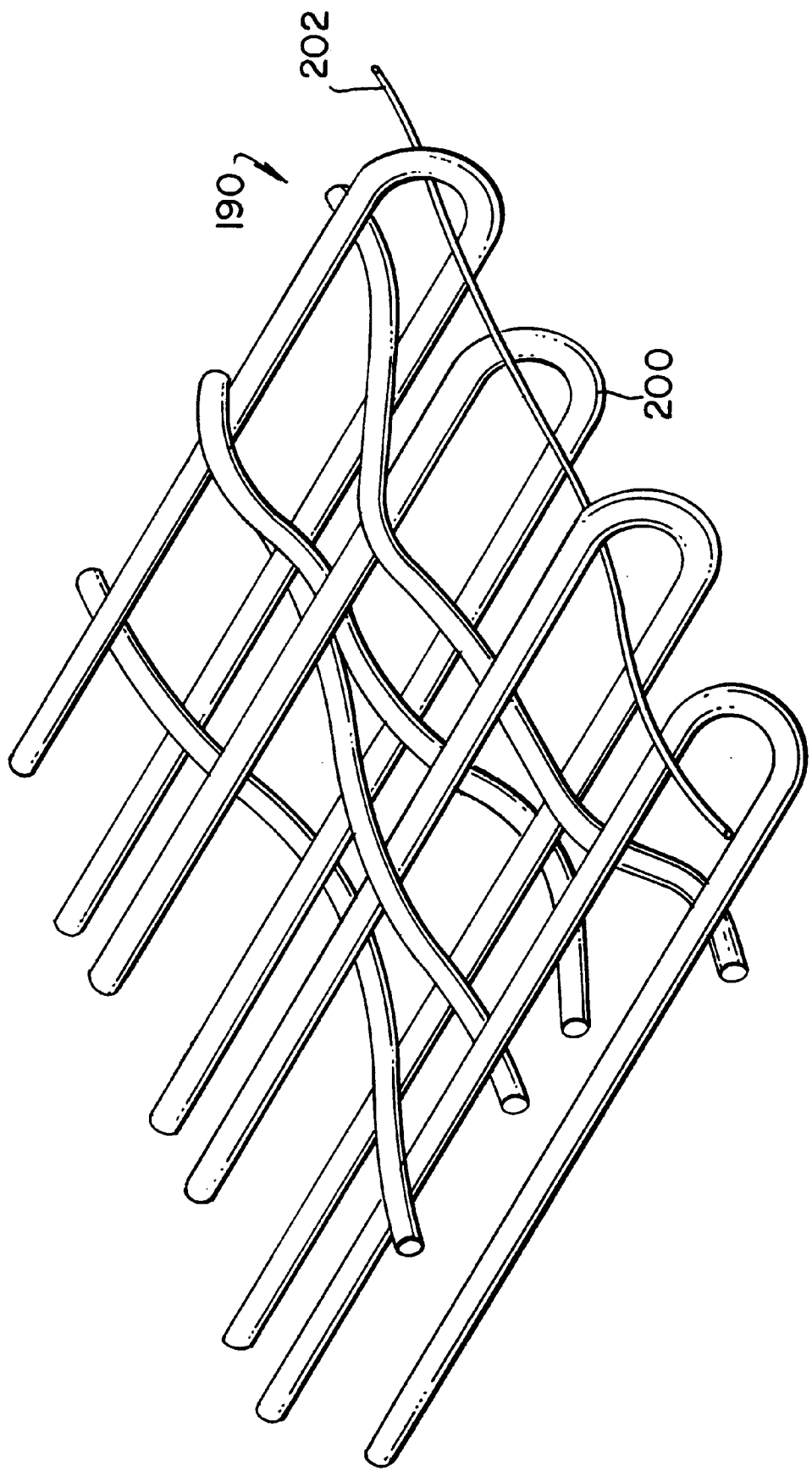
FIG. 6 is a schematic perspective view of the seaming loops in a fabric produced in accordance with the teachings of the prior art.

In addition, the outer base fabric 30 of the prior-art papermaker's fabric 20 shown in FIG. 2 is produced in accordance with the invention shown in U.S. Pat. Nos. 5,476,123 and 5,531,251, the teachings of both of which are incorporated herein by reference. As shown more clearly in FIG. 6, a schematic perspective view of the seaming loops 200 of a fabric 190 produced in accordance with the invention shown in these patents an extra CD yarn 56 is woven with the outer portions of each of the seaming loops 52 as extra CD yarn 202 is woven with the outer portions of each of the seaming loops 200 in FIG. 6. The extra CD yarns 56 form an extension of the system of CD yarns 38 of the outer base fabric 30 at the seaming loops 52, conforming the seam 32 more closely to the rest of the outer base fabric 30, so that staple fiber batt 50 will be better anchored to the region of seam 32 and so that the possibility of sheet marking by the seam 32 will be reduced.

Despite the presence of extra CD yarns 56, problems with sheet marking and seam integrity have persisted with the use of papermaker's fabric 20. The present invention is intended to provided a solution to these problems.

Figure 3:
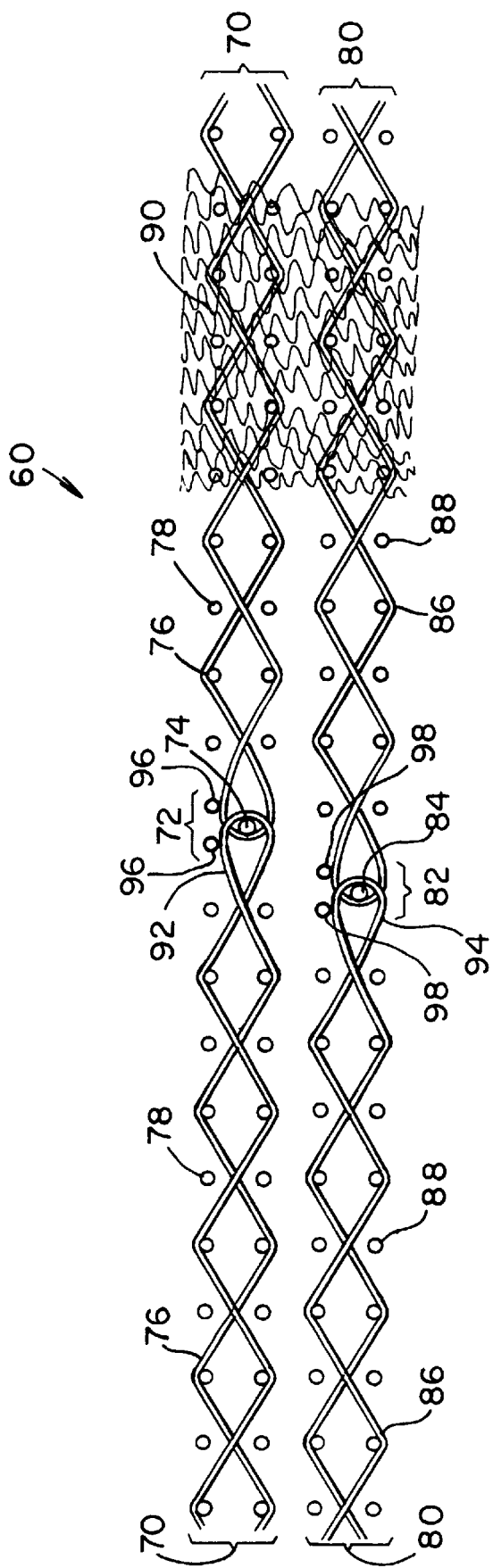
FIG. 3 is a cross-sectional view, analogous to that provided in FIG. 2, of an on-machine-seamable press fabric of the present invention.

To that end, FIG. 3 is a cross-sectional view, analogous to that provided in FIG. 2, of a first embodiment of the on-machine-seamable papermaker's fabric 60 .of the present invention.

Figure 4:
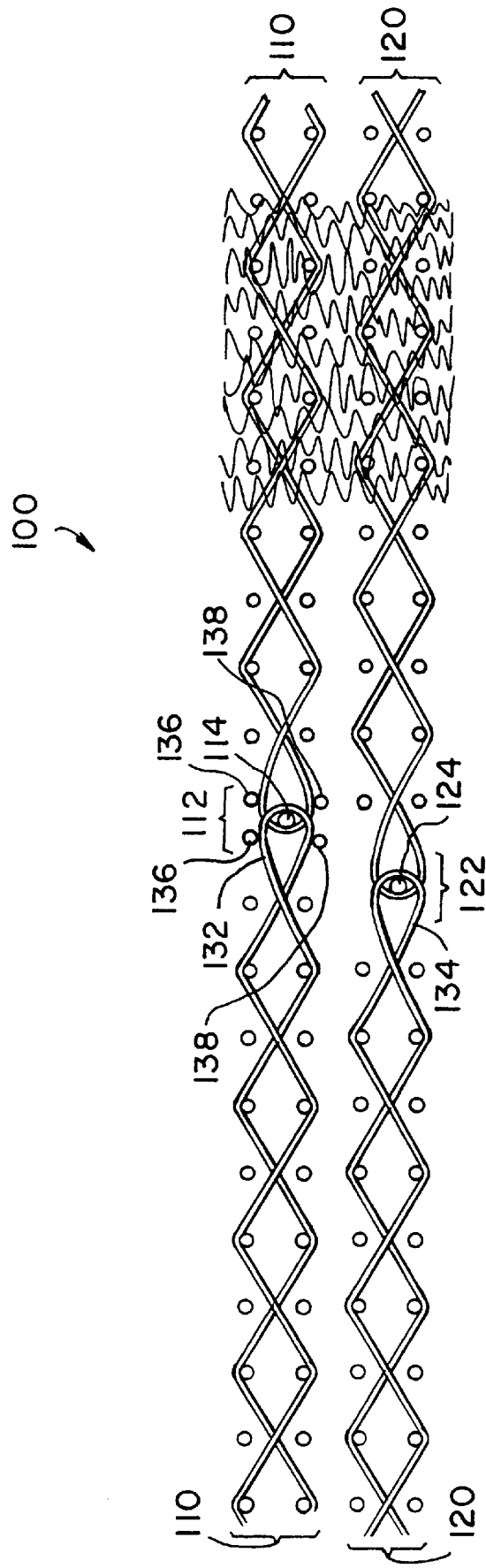
FIG. 4 is a cross-sectional view, also analogous to that provided in FIG. 2, of an alternate embodiment of the on-machine-seamable press fabric of the present invention.
Figure 5:
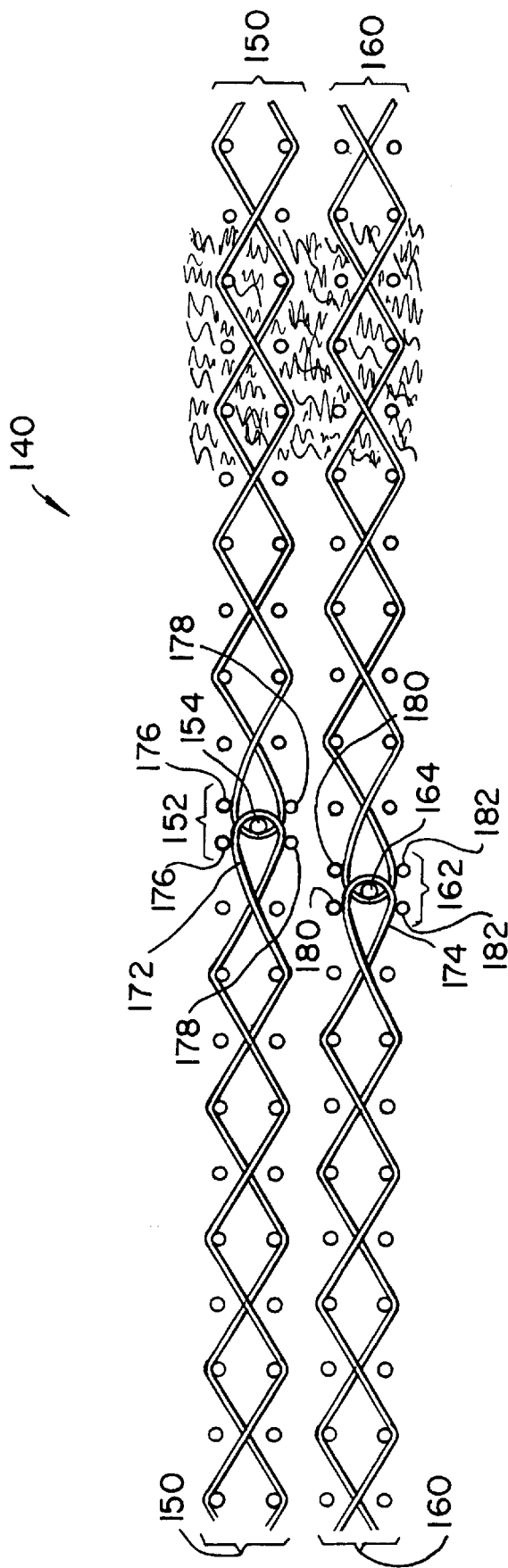
FIG. 5 is a cross-sectional view, again analogous to that provided in FIG. 2, of still another embodiment of the on-machine-seamable press fabric of the present invention.

Much of the description of the prior-art papermaker's fabric 20 shown in FIG. 2 applies to papermaker's fabric 60 shown in FIG. 3, as well as to papermaker's fabrics 100, 140 shown in FIGS. 4 and 5, respectively. Papermaker's fabric 60 has an outer base fabric 70 which surrounds an inner base fabric 80, the latter being joined into endless form within the endless-loop form of the former. Seam 82 of inner base fabric 80 is closed by directing pintle 84 therethrough at the same time as seam 72 of outer base fabric 70 is closed by directing pintle 74 therethrough. Inner base fabric 80 and outer base fabric 70 are joined to one another by needling one or more layers of staple fiber batt 90 into at least one of the base fabrics 70, 80 to join the two base fabrics 70, 80 to one another. Again, staple fiber batt 90 is shown in only a portion of FIG. 3.

Outer base fabric 70 is woven from MD yarns 76 and CD yarns 78. MD yarns 76 form seaming loops 92 which are interdigitated and joined to one another by directing pintle 74 through the passage defined by the interdigitated seaming loops 92 to form seam 72. Inner base fabric 80 is woven from MD yarns 86 and CD yarns 88. MD yarns 86 form seaming loops 94 which are interdigitated and joined to one another by directing pintle 84 through the passage defined by the interdigitated seaming loops 94 to form seam 82. Outer base fabric 70 and inner base fabric 80 may be of different weave patterns.

MD yarns 76, CD yarns 78, MD yarns 86 and CD yarns 88 may each be of any of the yarn types used to weave papermachine clothing, and may include filaments extruded from any of the synthetic polymeric resin materials used for the production of yarns for papermachine clothing, both of which have been identified above in the description of the prior-art papermaker's fabric 20 shown in FIG. 2.

Pintles 74, 84 may also be as set forth above, and seam 72 in outer base fabric 70 is offset longitudinally (in the machine direction) from seam 82 in inner base fabric 80.

In accordance with this first embodiment of the present invention, both the outer base fabric 70 and the inner base fabric 80 are produced in accordance with the inventions shown in U.S. Pat. Nos. 5,476,123 and 5,531,251. That is to say, an extra CD yarn 96 is woven with the outer portions of each of the seaming loops 92 of the outer base fabric 70 and an extra CD yarn 98 is woven with the outer portions of each of the seaming loops 94 of the inner base fabric 80.

In the second embodiment of the present invention, shown in cross section in FIG. 4, papermaker's fabric 100 has an outer base fabric 110 and an inner base fabric 120. Outer base fabric 110 has a seam 112 closed by pintle 114, while inner base fabric 120 has a seam 122 closed by pintle 124. Outer base fabric 110 includes seaming loops 132, and inner base fabric 120 includes seaming loops 134.

In accordance with this second embodiment of the present invention, an extra CD yarn 136 is woven with the outer portions of each of the seaming loops 132 of the outer base fabric 110, and an extra CD yarn 138 is woven with the inner portions of each of the seaming loops 132 of the outer base fabric 110.

In the third embodiment of the present invention, shown in cross section in FIG. 5, papermaker's fabric 140 has an outer base fabric 150 and an inner base fabric 160, both of which have extra CD yarns in the same manner as outer base fabric 110 of papermaker's fabric 100 in FIG. 4. Outer base fabric 150 has a seam 152 closed by pintle 154, while inner base fabric 160 has a seam 162 closed by pintle 164. Outer base fabric 150 includes seaming loops 172, and inner base fabric 160 includes seaming loops 174.

In accordance with this third embodiment, an extra CD yarn 176 is woven with the outer portions of each of the seaming loops 172 of the outer base fabric 150, and an extra CD yarn 178 is woven with the inner portions of each of the seaming loops 172. At the same time, an extra CD yarn 180 is woven with the outer portions of each of the seaming loops 174 of the inner base fabric 160, and an extra CD yarn 182 is woven with the inner portions of each of the seaming loops 172.

Extra CD yarns 96, 98, 136, 138, 176, 178, 180, 182 may also be of any of the types used to weave papermachine clothing. That is to say, monofilament yarns or plied/twisted yarns, in the form of plied monofilament or plied multifilament yarns, may be used as any of these yarns. Extra CD yarns 96, 98, 136, 138, 176, 178, 180, 182 may also be the coated yarns shown in commonly assigned U.S. Pat. Nos. 5,204,150 and 5,391,419, the teachings of both of which are incorporated herein by reference. Further, the filaments comprising extra CD yarns 96, 98, 136, 138, 176, 178, 180, 182 may be extruded from synthetic polymeric resin materials, such as polyamide, polyester, polyetherketone, polypropylene, polyaramid, polyolefin and polyethylene terephthalate (PET) resins, and incorporated into yarns according to techniques well-known in the textile industry and particularly in the papermachine clothing industry. The extra CD yarns 96, 98, 136, 138, 176, 178, 180, 182 may also be of a polymeric resin material having a lower melting point than the other yarns in the papermaker's fabrics 60, 100, 140 to provide by heating a more efficient fiber anchorage in the seam region. They may also have cross sections of round, flat or other geometric shapes.

Figure 7:
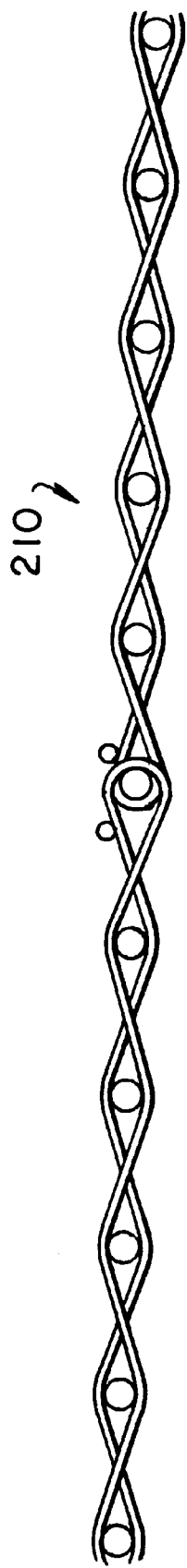
FIG. 7 is a cross-sectional view of a single-layer weave.
Figure 8:
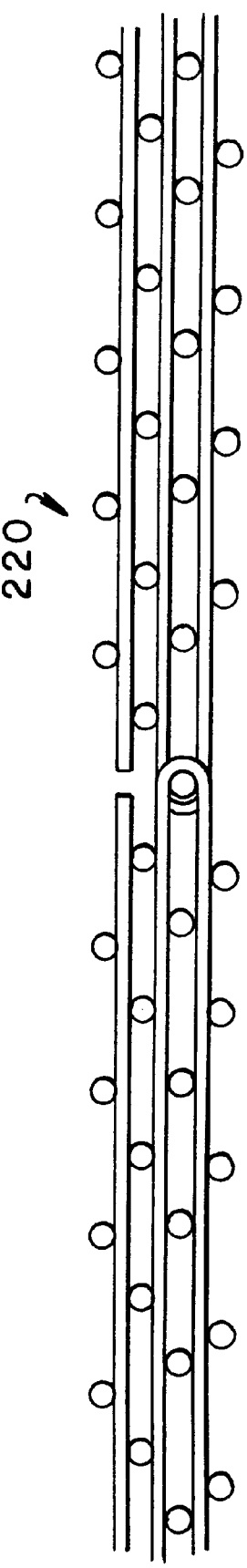
FIG. 8 is a cross-sectional view of a three-layer weave.

While base fabrics 70, 80, 110, 120, 150, 160 are shown in FIGS. 3, 4 and 5 as being of a two-layer weave, it should be understood that each could be woven in any of the weave patterns, such as, for example, one-, two- or three-layer weave patterns, used by those of ordinary skill in the art to weave paper machine clothings. FIG. 7 is a cross-sectional view of a single-layer weave 210 which may be used in the practice of the present invention, and FIG. 8 is a cross-sectional view of a three-layer weave 220 useful for this same purpose. Further, one or both of the base fabrics in any of the papermaker's fabrics 60, 100, 140 may be a fabric of the variety shown in commonly assigned U.S. Pat. No. 4,979,543 to Moriarty et al., the teachings of which are incorporated herein by reference.

Figure 9:
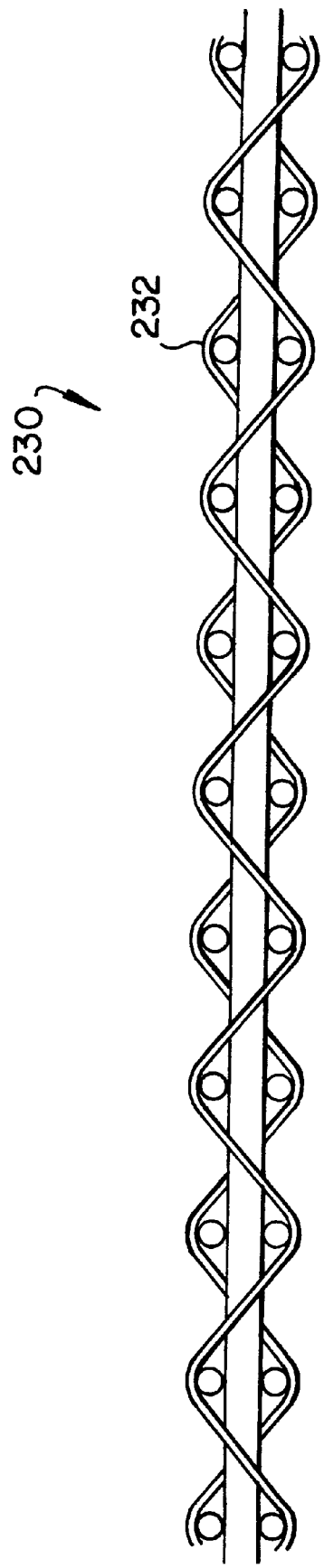
FIG. 9 is a cross-sectional view of a fabric having separate binder yarns.

In U.S. Pat. No. 4,979,543, a press fabric having a plurality of layers of machine-direction and cross-machine-direction yarns is shown. The yarns for each layer are oriented in parallel with respect to each other and perpendicular with respect to the yarns of immediately adjacent layers. The yarns of one layer do not bind the yarns of adjacent layers. Separate binder yarns bind the layers together. FIG. 9, which is based upon FIG. 2 of U.S. Pat. No. 4,979,543, is a cross-sectional view of a fabric 230 having separate binder yarns 232.

The fabric defines two machine-direction oriented edges and two cross-machine-direction oriented edges, whereby, at each cross-machine-direction oriented edge, certain machine-direction yarns extend from one layer a distance sufficient to form a loop and then return to the same cross-machine-direction oriented edge into another layer of machine-direction yarns.

A staple fiber batt may be entangled into the fabric by needling. Where this is the case, the needling may actually break the separate binder yarns, which are generally thinner than the structural machine-direction and cross-machinedirection yarns. As a consequence, the staple fiber batt, needled into the cross-crossed structure of the structural yarns, binds the fabric together.

The present invention provides a more closed seam region having a reduced tendency to mark a fibrous cellulosic web being dewatered. The presence of the extra CD yarns woven with the seaming loops provides additional anchoring between the two bases in the seam area, thereby inhibiting delamination. Further, the extra CD yarns enable additional staple fiber batt to anchor on the inner portions of the seam region of the inner base fabric, thereby improving the abrasion resistance of the seam region. As a consequence, the present invention provides a papermaker's fabric having improved seam integrity and less seam marking than those of the prior art.

Modifications to the above would be obvious to those of ordinary skill in the art, but would not bring the invention so modified beyond the scope of the appended claims.

What is claimed is:

1. An on-machine-seamable papermaker's fabric comprising:
    a first base fabric, said first base fabric having a system of first machine-direction (MD) yarns and a system of first cross-machine direction (CD) yarns, said yarns of said system of first MD yarns being bound to said yarns of said system of first CD yarns to form said first base fabric in a rectangular shape with a length, a width, two lengthwise edges, two widthwise edges, a first side and a second side, said first MD yarns extending for said length of said first base fabric and forming first seaming loops along each of said two widthwise edges thereof;
    a second base fabric, said second base fabric having a system of second MD yarns and a system of second CD yarns, said yarns of said system of second MD yarns being bound to said yarns of said system of second CD yarns to form said second base fabric in a rectangular shape with a length, a width, two lengthwise edges, two widthwise edges, a first side and a second side, said second MD yarns extending for said length of said second base fabric and forming second seaming loops along each of said two widthwise edges thereof;
    said first base fabric and said second base fabric having substantially equivalent lengths and widths, and being joined to one another by at least one layer of staple fiber batt entangled therethrough, so that said second side of said first base fabric adjoins said first side of said second base fabric,
    wherein at least one extra CD yarn is woven with at least two of:
        a) said first side of said first seaming loops of at least one widthwise edge of said first base fabric;
        b) said second side of said first seaming loops of at least one widthwise edge of said first base fabric;
        c) said first side of said second seaming loops of at least one widthwise edge of said second base fabric; and
        d) said second side of said second seaming loops of at least one widthwise edge of said second base fabric.

2. An on-machine-seamable papermaker's fabric as claimed in claim 1 wherein said first base fabric and said second base fabric are offset with respect to one another in a lengthwise direction when so joined, so that said first seaming loops at one widthwise edge of said first base fabric coincide with a non-seam region of said second base fabric, and said second seaming loops at one widthwise edge of said second base fabric coincide with a non-seam region of said first base fabric.

3. An on-machine-seamable papermaker's fabric as claimed in claim 1 wherein said first base fabric is an outer base fabric and said second base fabric is an inner base fabric when said papermaker's fabric is joined into the form of an endless loop; said first sides of said first and second base fabrics and their respective first and second seaming loops face outward with respect to said endless loop; and said second sides of said first and second base fabrics and their respective first and second seaming loops face inward with respect to said endless loop.

4. An on-machine-seamable papermaker's fabric as claimed in claim 3 wherein said first sides of said first and second seaming loops of at least one widthwise edge of said first and second base fabrics, respectively, have at least one extra CD yarn woven therewith.

5. An on-machine-seamable papermaker's fabric as claimed in claim 3 wherein said first and second sides of said first seaming loops of at least one widthwise edge of said first base fabric have at least one extra CD yarn woven therewith.

6. An on-machine-seamable papermaker's fabric as claimed in claim 3 wherein said first and second sides of said first seaming loops of at least one widthwise edge of said first base fabric, and said first and second sides of said second seaming loops of at least one widthwise edge of said second base fabric, have at least one extra CD yarn woven therewith.

7. An on-machine-seamable papermaker's fabric as claimed in claim 1 wherein said yarns of said system of first MD yarns are interwoven with said yarns of said system of first CD yarns to form said first base fabric.

8. An on-machine-seamable papermaker's fabric as claimed in claim 7 wherein said yarns of said system of first MD yarns are interwoven with said yarns of said system of first CD yarns in a single-layer weave.

9. An on-machine-seamable papermaker's fabric as claimed in claim 7 wherein said yarns of said system of first MD yarns are interwoven with said yarns of said system of first CD yarns in a two-layer weave.

10. An on-machine-seamable papermaker's fabric as claimed in claim 7 wherein said yarns of said system of first MD yarns are interwoven with said yarns of said system of first CD yarns in a three-layer weave.

11. An on-machine-seamable papermaker's fabric as claimed in claim 1, said first base fabric further comprising a system of binder yarns in at least one of said machine and cross-machine directions, said yarns of said system of binder yarns binding said yarns of said system of first MD yarns to said yarns of system of first CD yarns to form said first base fabric.

12. An on-machine-seamable papermaker's fabric as claimed in claim 1, said first base fabric further comprising a staple fiber batt, said staple fiber batt being entangled with said yarns of said system of first MD yarns and with said yarns of said system of first CD yarns to bind said yarns of said system of first MD yarns to said yarns of said system of first CD yarns to form said first base fabric.

13. A on-machine-seamable papermaker's fabric as claimed in claim 1 wherein said yarns of said system of second MD yarns are interwoven with said yarns of said system of second CD yarns to form said second base fabric.

14. An on-machine-seamable papermaker's fabric as claimed in claim 13 wherein said yarns of said system of second MD yarns are interwoven with said yarns of said system of second CD yarns in a single-layer weave.

15. An on-machine-seamable papermaker's fabric as claimed in claim 13 wherein said yarns of said system of second MD yarns are interwoven with said yarns of said system of second CD yarns in a two-layer weave.

16. An on-machine-seamable papermaker's fabric as claimed in claim 13 wherein said yarns of said system of second MD yarns are interwoven with said yarns of said system of second CD yarns in a three-layer weave.

17. An on-machine-seamable papermaker's fabric as claimed in claim 1, said second base fabric further comprising a system of binder yarns in at least one of said machine and cross-machine directions, said yarns of said system of binder yarns binding said yarns of said system of second MD yarns to said yarns of said system of second CD yarns to form said second base fabric.

18. An on-machine-seamable papermaker's fabric as claimed in claim 1, said second base fabric further comprising a staple fiber batt, said staple fiber batt being entangled with said yarns of said system of second MD yarns and with said yarns of said system of second CD yarns to bind said yarns of said system of second MD yarns to said yarns of said system of second CD yarns to form said second base fabric.

* * * * *